(12) United States Patent
Sharlet et al.

(10) Patent No.: US 8,576,926 B2
(45) Date of Patent: Nov. 5, 2013

(54) SINGLE FRAME ARTIFACT FILTRATION AND MOTION ESTIMATION

(75) Inventors: Dillon Sharlet, Albuquerque, NM (US); Joseph Greer, Portland, OR (US)

(73) Assignee: Cinnafilm, Inc., Albuquerque, NM (US)

( * ) Notice: Subject to any disclaimer, the term of this patent is extended or adjusted under 35 U.S.C. 154(b) by 352 days.

(21) Appl. No.: 12/944,344

(22) Filed: Nov. 11, 2010

(65) Prior Publication Data

US 2011/0109803 A1 May 12, 2011

Related U.S. Application Data

(60) Provisional application No. 61/260,208, filed on Nov. 11, 2009, provisional application No. 61/368,905, filed on Jul. 29, 2010.

(51) Int. Cl.
*H04N 7/12* (2006.01)
*H04N 11/02* (2006.01)
*H04N 5/00* (2011.01)
*H04N 5/21* (2006.01)

(52) U.S. Cl.
USPC ............ 375/240.29; 375/240.15; 375/240.27; 348/607

(58) Field of Classification Search
USPC ............ 375/240.15, 240.27, 240.29; 348/607
See application file for complete search history.

(56) References Cited

U.S. PATENT DOCUMENTS

| | | | |
|---|---|---|---|
| 5,500,685 A * | 3/1996 | Kokaram | 348/620 |
| 5,619,228 A * | 4/1997 | Doherty | 345/693 |
| 6,297,847 B1 * | 10/2001 | Fisch | 348/447 |
| 6,661,470 B1 * | 12/2003 | Kawakami et al. | 348/699 |
| 2006/0115178 A1 * | 6/2006 | Fan et al. | 382/275 |
| 2006/0232712 A1 * | 10/2006 | Zhou et al. | 348/701 |
| 2007/0291857 A1 * | 12/2007 | Hussain | 375/240.29 |
| 2008/0056386 A1 * | 3/2008 | Adams | 375/240.26 |
| 2008/0074561 A1 * | 3/2008 | Arai et al. | 348/744 |
| 2009/0049246 A1 * | 2/2009 | Sihn | 711/118 |
| 2009/0245375 A1 * | 10/2009 | Liu | 375/240.16 |
| 2010/0266041 A1 * | 10/2010 | Gish et al. | 375/240.15 |

* cited by examiner

*Primary Examiner* — Anner Holder
*Assistant Examiner* — On S Mung
(74) *Attorney, Agent, or Firm* — Peacock Myers, P.C.; Jeffrey D. Myers

(57) ABSTRACT

A video processing method comprising receiving a video stream comprising a plurality of frames, removing via one or more non-binary artifact functions a plurality of artifact pixels from the video stream, and outputting the video stream with the artifact pixels removed.

9 Claims, No Drawings

SINGLE FRAME ARTIFACT FILTRATION AND MOTION ESTIMATION

CROSS-REFERENCE TO RELATED APPLICATIONS

This application claims priority to and the benefit of the filing of U.S. Provisional Patent Application Ser. No. 61/260,208, entitled "Single Frame Artifact Filter", filed on Nov. 11, 2009, and of U.S. Provisional Patent Application Ser. No. 61/368,905, entitled "Single Frame Artifact Filter and Motion Estimation Techniques", filed on Jul. 29, 2010, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods, apparatuses, and computer software for removing single frame artifacts from motion pictures and for handling motion estimation.

2. Description of Related Art

The need and desire to make video, particularly that converted from stock footage on traditional film, look less grainy and noisy is a considerable challenge due to high transfer costs and limitations of available technologies that are not only time consuming, but provide poor results.

The present invention has approached the problem in unique ways, resulting in the creation of a method, apparatus, and software that not only changes the appearance of video footage to substantially remove film grain and noise effects, but performs this operation in real-time or near real-time. The invention (occasionally referred to as Cinnafilm®) streamlines current production processes for professional producers, editors, and filmmakers who use digital video to create their media projects. The invention permits conversion of old film stock to digital formats without the need for long rendering times and extensive operator intervention associated with current technologies.

BRIEF SUMMARY OF THE INVENTION

The present invention is of a video processing method comprising: receiving a video stream comprising a plurality of frames; removing via one or more non-binary artifact functions a plurality of artifact pixels from the video stream; and outputting the video stream with the artifact pixels removed. In the preferred embodiment, removing comprises removing via one or more non-binary artifact functions generating a confidence level that a pixel is an artifact pixel, one or more non-binary artifact functions not employing a Spike Detector Index, and/or one or more non-binary artifact functions employing an error function employing down-sampling. Receiving comprises receiving a motion-compensated video stream, preferably generated via hierarchical phase correlation motion estimation, more preferably wherein the generation comprises building an image pyramid where each level of the pyramid is low pass filtered and downsampled, and most preferably wherein the generation comprises finding subpixel peak locations. The generating can also be done via a mask indicating where motion compensation is valid, preferably wherein the mask is generated by evaluating compensated blocks to find the largest squared difference between two pixels and dividing by a maximum value found in either block subtracted from a minimum value in either block. The generating can further be done via an LRU cache in which a key of the cache is a frame index and a hash of filters in a sequence leading up to the cached result.

The present invention is also of a video processing method comprising: receiving a video stream comprising a plurality of motion-compensated frames generated via hierarchical phase correlation motion estimation; removing a plurality of artifact pixels from the video stream; and outputting the video stream with the artifact pixels removed. In the preferred embodiment, generating comprises building an image pyramid where each level of the pyramid is low pass filtered and downsampled, most preferably wherein the generation comprises finding subpixel peak locations.

The present invention is further of a video processing method comprising: receiving a video stream comprising a plurality of motion-compensated frames generated via a mask indicating where motion compensation is valid; removing a plurality of artifact pixels from the video stream; and outputting the video stream with the artifact pixels removed. In the preferred embodiment, the mask is generated by evaluating compensated blocks to find the largest squared difference between two pixels and dividing by a maximum value found in either block subtracted from a minimum value in either block.

The present invention is additionally of a video processing method comprising: receiving a video stream comprising a plurality of motion-compensated frames generated via an LRU cache in which a key of the cache is a frame index and a hash of filters in a sequence leading up to the cached result; removing a plurality of artifact pixels from the video stream; and outputting the video stream with the artifact pixels removed.

Objects, advantages and novel features, and further scope of applicability of the present invention will be set forth in part in the detailed description to follow, and in part will become apparent to those skilled in the art upon examination of the following, or may be learned by practice of the invention.

BRIEF DESCRIPTION OF THE SEVERAL VIEWS OF THE DRAWINGS

Not applicable.

DETAILED DESCRIPTION OF THE INVENTION

The present invention is of a method, apparatus, and computer software for substantially detecting and, if desired, removing single frame artifacts from video streams. While the preferred embodiment of the invention is directed to removing artifacts originally found on film that has been digitized, the invention is also useful in removing artifacts from any type of video stream, live or not live.

The single-frame artifact filter of the invention is broadly based on the binary single-frame artifact model:

$$g(n,k)=(1-b(n,k))f(n,k)+c(n,k) \quad (1)$$

In Eq. (1), $g(n, k)$ is the processed video signal, $b(n, k)$ is the binary artifact detection function that is defined as 1 if pixel n of frame k is an artifact and 0 otherwise, $f(n, k)$ is the incoming video signal and $c(n, k)$ is the correction function which just takes pixels from the neighboring, motion compensated frame.

The preferred artifact detection function is also broadly based on the SDI (Spike Detector Index):

$$b(n,k)=1 \text{ if } SDI(n,k)>\text{threshold, 0 otherwise} \quad (2)$$

where $SDI(n, k)$ is given by $\min((f(n, k)-m\_k(n, k-1))^2, (f(n, k)-m\_k(n, k+1))^2)$.

$m\_k(n, k-1)$ and $m\_k(n, k+1)$ are frames k−1 and k+1 motion compensated to frame k. The present single-frame artifact filter has several major modifications to this artifact detection function, $b(n, k)$, and the correction function, $c(n, k)$, which drastically decrease false positives due to motion artifacts and increase the quality of repair to detected artifacts.

One first modifies the model to be non-binary, which improves the quality of the repairs. Assuming even a perfect artifact detection function, a binary artifact model is problematic because it has harsh discontinuities at the perimeter of repaired artifacts due to imperfect motion compensation, as well as any film grain and noise that are present in the surrounding pixels of the video signal. One replaces the binary model with the following:

$$g(n,k)=\text{lerp}(m\_k(n,k-1),f(n,k),b(n,k)). \quad (3)$$

Note that if instead of using a binary artifact function one lets $b(n, k)$ take values in [0, 1] based on confidence that a given pixel is an artifact, then Eq. (3) is equivalent to $$g(n,k)=(1-b(n,k))f(n,k)+b(n,k)c(n,k),$$

which is a generalization of Eq. (1) to a non-binary model. This makes for less noticeable discontinuities at the edge of artifact repairs. In addition, one preferably applies a non-normalized Gaussian filter to $b(n, k)$ to further smooth the repairs as well as "fill in" any partial repairs of artifacts.

$b(n, k)$ was modified to take values in [0, 1] as follows:

$$b(n,k)=\text{saturate}(e(n,k)-\text{threshold}) \quad (4)$$

where $e(n, k)$ is a new error function described below, analogous to $SDI(n, k)$.

Eq. (4) is a generalization from the binary case to [0, 1] because it replaces a unit step function, which may be seen as a piecewise linear function with a vertical line at x=threshold, with a piecewise linear function with a line starting at x=threshold and ending at x=threshold+1.

The second major modification is the replacement of SDI $(n, k)$ with $e(n, k)$, a new error function. The problem with $SDI(n, k)$ is that it is too prone to false positives due to motion artifacts. From experimentation, $SDI(n, k)$ may very well be greater than $SDI(n', k)$ in the case that there are motion artifacts at pixel n and pixel n' is an actual piece of dust. In other words, no amount of post processing to $b(n, k)$ could ever remove false positives without creating false negatives because there is absolutely no way of differentiating between the two with the spike detector index alone.

$e(n, k)$ is preferably computed as follows: $f(n, k)$, $m\_k(n, k-1)$, and $m\_k(n, k+1)$ are each down-sampled, twice, by factor of N (which is a user-adjustable parameter) in both width and height to images each. One triple of images, fmax$(n, k)$, m_kmax$(n, k-1)$, m_kmax$(n, k+1)$ is a down-sampled using a max filter, i.e. fmax$(n, k)$=max over luminance values of N×N neighborhood of pixels of $f(n, k)$ and m_kmax$(n, k-1)$, m_kmax$(n, k+1)$ are defined similarly. The other triple of images, fmin$(n, k)$, m_kmin$(n, k-1)$, and m_kmin$(n, k+1)$ are down-sampled using a min-filter. The artifact detection is done separately on the two triples of down-sampled images (m_kmin$(n, k-1)$, fmin$(n, k)$, m_kmin$(n, k+1)$) and (m_kmax $(n, k-1)$, fmax$(n, k)$, m_kmax$(n, k+1)$). The reason for down-sampling is that it eliminates pixel-level anomalies in the motion-compensated images that cause motion artifacts. A typical lowpass filter for down-sampling would make detection of certain artifacts harder since small artifacts are eliminated because a typical low-pass filter eliminates high-frequency content in the signal, but using the min and max filters to down-sample allows us to preserve the artifacts since they tend to have extreme luminance values while reducing pixel-level anomalies in motion compensation. This reduces false positives while maintaining or decreasing false negatives.

Define emin$(n, k)$ and emax$(n, k)$ for each triple as follows:

$$\text{emin}(n,k)=\min(ab,bc)/d-\text{threshold}$$

where ab:=(fmin$(n, k)$−m_kmin$(n, k-1))^2$ and bc:=(fmin$(n, k)$−m_kmin$(n, k+1))^2$ and d:=max over M×M neighborhood (m_kmin$(n, k-1)$−m_kmax$(n, k+1))^2$. M is a user-adjustable parameter.

emax$(n, k)$ is defined similarly but ab, bc, and d are computed using the other triple of down-sampled images.

emin$(n, k)$ and emax$(n, k)$ are similar to the continuous version of SDI given in Eq. (4) but with a modification that serves to vastly decrease false positives due to motion artifacts, the division by d. If $m\_k(n, k-1)$, $m\_k(n, k+1)$ are correctly motion compensated, then one would expect (m_k $(n, k-1)$−m_k$(n, k+1))^2$ to be small and large otherwise. The max is taken over a neighborhood of pixels because in areas where motion compensation is poor, the quantity may be small for individual pixels but it will definitely be large for at least one pixel in the neighborhood. If neighboring pixels are not taken into account, then certain pixels will be filtered even though they lie in areas of poor motion compensation. Therefore it provides much more robustness against motion artifacts. In addition, it is efficient, since computing this number in the down-sampled image means that a neighborhood of M×M pixels in the down-sampled image corresponds to a neighborhood of NM×NM pixels in the original image (if a factor of N is used for down-sampling).

Finally, emax and emin are upsampled to the original image size then $e(n, k)$ is defined as max(emin$(n, k)$, emax$(n, k)$).

Although the invention can be implemented on a variety of computer hardware/software platforms, including software stored in a computer-readable medium, one embodiment of hardware according to the invention incorporates a CUDA (Compute Unified Device Architecture) capable GPU, such as those provided by NVIDIA®.

The apparatus of the invention is preferably built into a sturdy, thermally proficient mechanical chassis, and conforms to common industry rack-mount standards. The apparatus preferably has two sturdy handles for ease of installation. I/O ports are preferably located in the front of the device on opposite ends. Power on/off is preferably located in the front of the device, in addition to all user interfaces and removable storage devices (e.g., DVD drives, CD-ROM drives, USB inputs, Firewire inputs, and the like). The power cord preferably extrudes from the unit in the rear. An Ethernet port is preferably located anywhere on the box for convenience, but hidden using a removable panel. The box is preferably anodized black wherever possible, and constructed in such a manner as to cool itself via convection only. The apparatus of the invention is preferably locked down and secured to prevent tampering.

An apparatus according to a non-limiting embodiment of the invention takes in a digital video/audio stream on an input port (preferably SDI, or from a video data file or files, and optionally uses a digital video compression-decompression software module (CODEC) to decompress video frames and the audio buffers to separate paths (channels). The video is preferably decompressed to a two dimensional (2D) array of pixel interleaved luminance-chrominance (YCbCr) data in either 4:4:4 or 4:2:2 sampling, or, optionally, red, green, and blue color components (RGB image, 8-bits per component). Due to texture resource alignment requirements for some graphics cards, the RGB image is optionally converted to a red, green, blue, and alpha component (RGBA, 8-bits per component) buffer. The audio and video is then processed by a sequence of operations, and then can be output to a second output port (SDI) or video data file or files.

Although other computer platforms can be used, one embodiment of the present invention preferably utilizes commodity x86 platform hardware, high end graphics hardware, and highly pipelined, buffered, and optimized software to achieve the process in real time (or near real time with advanced processing). This configuration is highly reconfigurable, can rapidly adopt new video standards, and leverages the rapid advances occurring in the graphics hardware industry.

The invention is also of a method, apparatus, and computer software for motion estimation in video streams, next discussed.

Hierarchical Phase Correlation Motion Estimator (HPC).

Build an image pyramid for two frames A and B with size (w, h) to estimate the motion between, where each level of the pyramid is low pass filtered and downsampled by a factor of 2 until the width or height of the next step would be less than N, the block size in pixels. There will be approximately L=log 2(min(w, h)/N) levels in the pyramid.

Starting with the top of the pyramid, divide the image into blocks of N×N pixels. Perform phase correlation step to create a correlation surface for each block. Find the peak of the correlation surface and store the resulting motion vector in a motion vector field $M_L$.

For each level i<L, divide the level into blocks of N×N pixels. Compensate the motion for each block using the vector field $M_{i+1}$ from the previous level. Perform the phase correlation step and find the peak, and store the resulting vector plus the vector from $M_{i+1}$ used to compensate this block in $M_i$.

The peak finding algorithm offers an opportunity for an extremely efficient subpixel accuracy extension. Let the peak be found at the bin of the phase correlation surface x be $x_{i,j}$. To find the precise subpixel location of the peak, approximate the peak with parabolas fitted to the bins $\{x_{i-1,j}, x_{i,j}, x_{i+1,j}\}$ and $\{x_{i,j-1}, x_{i,j}, x_{i,j+1}\}$. Note that the correlation surface is periodic. The maximum of this parabola is taken as the subpixel location of the peak. This subpixel method can be applied to any level of the motion estimator, including $M_0$ to produce subpixel accurate vectors at the final step.

When $M_i$ is written, one can employ a refinement step such as comparing the set of neighboring block's vectors (in the spatial domain using a technique like the sum of the squared differences, SSD) that will improve the accuracy and smoothness of the vector field.

When the vector field $M_0$ is written, the motion estimation process is complete.

Generally, N is rather large in order to realize the benefits of using phase correlation. This results in a very coarse vector field. To improve the accuracy of the motion estimator along edges of objects, a subdivision step is applied to the vector field $M_0$. The subdivision step is a spatial domain technique where the candidate vector set for the subdivided vector field is the 3 vectors from $M_0$ that contain the subdivided vector, and the nearest neighboring block in both the horizontal and vertical directions. Per pixel motion vectors can be produced efficiently with this method.

This motion estimator combines the benefits of typical hierarchical block matching such as uniform vector fields with the benefits of phase correlation such as robustness against noise and larger search areas as well as more accessible techniques for subpixel accuracy such as fitting a parabola to the phase correlation surface peaks. While approximating the peak with a parabola is not entirely correct, this technique in practice has shown to be at least equivalent to ¼ pixel accurate vectors obtained with the traditional expanded candidate vector set in a block matching algorithm.

There are many ways in which the HPC performs better than hierarchical block matching, including the following.

Even with the above additional steps, the number of candidate vectors is significantly lower than in the spatial domain hierarchical block matching algorithm, especially if one were to achieve the same search distance that is achieved by the phase correlation technique as opposed to the standard +/−1 pixel candidate vector set for a logarithmic search block matching.

The techniques available for subpixel accuracy are far more efficient than spatial domain techniques which involve evaluating many candidate vectors with subpixel components. Fitting a parabola to the peak and finding the maximum is a trivial step compared to evaluating even one candidate vector.

Because subpixel techniques are so efficient, it is practical to use them at every level of the image pyramid. This can result in improved vector accuracy especially in the case of high frequency repeating patterns which are notorious for breaking down motion estimators.

More subjectively, phase correlation tends to be more robust and stable than block matching and less susceptible to breaking down in the presence of hard motion estimation situations such as repeating patterns and complex lighting environments.

In addition to the motion vectors, the present invention also stores a score value with each vector. The score value is created by taking the minimum phase correlation peak from a subset of the levels' blocks containing that block. These scores are useful for cut detection and weighing motion compensation solutions in many algorithms.

An outline follows for the preferred algorithm implemented on a GPU, given images A and B of size (w, h) in GPU memory. w and h should be a power of 2.

N—Block size in pixels.
Ns—Subdivided block size in pixels.
refine—Number of refinement iterations.
Downsample—Downsample image by a factor of 2 and return it.
CompensateBlocks—Motion compensate the blocks of B according to the motion vector field given and convert A and B to luminance only. It also windows the blocks using a Hann window.
FFT, IFFT—Perform forward and inverse FFT.
FindPeaks—Search the correlation surface given for the maximum, fit a parabola to the surface at the maximum and store the resulting location in the motion vector field.

Refine—Perform spatial domain vector candidate search using the current block and the neighboring blocks.
Subdivide—Subdivide the motion vector field using spatial domain vector candidate search using the parent block and the nearest neighboring blocks in each axis.
n=log 2(min(w, h)/N)

```
Set A₀ = A, B₀ = B
for(i = 1, l < n, i = i + 1)
    Aᵢ = Downsample(Aᵢ₋₁)
    Bᵢ = Downsample(Bᵢ₋₁)
Set Mₙ₋₁ to 1×1 motion vector field with zero vector.
for(i = n - 1, i >= 0, i = i - 1)
    (a, b) = CompensateBlocks(Aᵢ, Bᵢ, Mᵢ₊₁, N
    zₐ = FFT(a), z_b = FFT(b)
    z=zₐ z_b* / |zₐ z_b*|
    p = IFFT(z)
    Mᵢ = FindPeaks(Mᵢ, p, Mᵢ₊₁, N)
    for(j = 0, j < refine, j = j + 1)
        Mᵢ = Refine(Mᵢ, Aᵢ, Bᵢ, N)
M = Subdivide(M₀, A₀, B₀, Ns)
return M
```

In practice, it is preferred to implement a major optimization to the first three steps in the major for loop. Rather than CompensateBlocks returning two luminance images a, b, it returns a single complex image with a in the real component and b in the imaginary component. It is preferred to perform a single complex FFT, and unpack the real FFTs in the frequency domain to perform the phase correlation calculation.

The restriction that w and h is a power of 2 is quite restrictive. To modify the algorithm to handle non power of 2 images, it is preferred to zero pad the result of CompensateBlocks to be a multiple of N.

Fallback.

A challenging aspect of using motion vectors for image interpolation is to know when to not use motion compensation where the assumptions made by motion estimation and motion compensation break down. This class of algorithms is referred to herein as "fallback".

The preferred implementation of fallback is a significant departure from Applicant's previous implementations of this idea as it does not make use of the scores generated by the motion estimator. The fallback relies on a mask which indicates where motion compensation solutions are valid. To generate this mask, both frames are compensated on blocks corresponding to each motion vector as if to generate an interpolated output image. The compensated blocks A, B are evaluated by finding the largest squared difference between two pixels, and dividing this value by the maximum value found in either block subtracted from the minimum value in either block of size N:

$$\frac{(\max\{(A_{i,j} - B_{i,j})^2 \mid i, j \in N\})}{(\max\{A_{i,j}, B_{i,j} \mid i, j \in N\} - \min\{A_{i,j}, B_{i,j} \mid i, j \in N\})}$$

After this mask is generated, the mask is blurred with a Gaussian low pass filter to reduce artifacts caused by harsh boundaries in the mask.

The mask is used to blend between the motion compensated solution and a fallback solution, either the nearest original frame or a blending of the two frames at the same interpolation location as the motion compensated solution.

Global Caching Architecture for Temporal Video Processing.

When processing video with multiple temporal filters in sequence (filters that require more than one frame to produce an output frame), it is useful to build a system that facilitates this task. One such system is to define filters with a function $F(x)$ that outputs frame x. To get input frames, the filters can call F on the previous filter in the sequence. To prevent major inefficiency by unnecessarily reprocessing frames, an LRU cache is used, where the key of the cache is the frame index and a hash of the filters in the sequence leading up to the cached result. This design achieves the following goals.

It should enable ease of implementation of a temporal filter without concern for the previous filters in the sequence. If a filter's implementation of $F(x)$ calls the previous filters function with $F(x-1)$, $F(x)$, and $F(x+1)$ to produce frame x, this is easy to do. The cache will guard against processing frames more than once.

If a setting on a filter in the middle of the sequence changes, reprocessing the frame for displaying the updated result using the new setting is efficient. The hash of the sequence leading up to the changed filter will be unchanged, and so those requests will be cache hits.

If the system runs out of memory (the working set is larger than the size of the cache), the system will fail gracefully by reprocessing frames that otherwise would be cache hits. This leads to reduced performance, but the system still works to produce an output frame.

Filters can easily request frames via a non-trivial mapping to accommodate filters such as framerate conversions.

The core of the system is the function $F(x)$ and the cache architecture. However, other features can be added to make the system more usable in a user interface for viewing the results of the filtering, including the following.

It is preferred to also define a function that maps the frame indexes throughout the sequence of filters. Each filter can define its mapping independently, though most temporal filters such as noise reduction filters use the identity mapping. This mapping is necessary to implement some user interface features, such as indicating how long the video is after processing with a sequence of filters that have a non-trivial mapping.

It is also preferred to allow filters to manipulate the cache directly. Some filters find it useful to take a set of frames in, and write a set of frames out based on some expensive processing of the input set. Without the ability to explicitly add frames to the cache, the expensive processing would have to be repeated for each frame in the output set. With the ability to add frames to the cache, all the frames can be added explicitly, and the requests for the subsequent output frames will be cache hits.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover all such modifications and equivalents.

What is claimed is:

1. A video processing method comprising the steps of:
receiving a video stream comprising a plurality of frames;
generating from the video stream a motion-compensated video stream via a mask indicating where motion compensation is valid, wherein the mask is generated by evaluating compensated blocks to find the largest squared difference between two pixels and dividing by a maximum value found in either block subtracted from a minimum value in either block;
removing via one or more non-binary artifact functions a plurality of artifact pixels from the motion-compensated video stream; and
outputting the motion-compensated video stream with the artifact pixels removed.

2. The method of claim 1 wherein the removing step comprises removing via one or more non-binary artifact functions generating a confidence level that a pixel is an artifact pixel.

3. The method of claim 1 wherein the removing step comprises removing via one or more non-binary artifact functions not employing a Spike Detector index.

4. The method of claim 1 wherein the removing step comprises removing via one or more non-binary artifact functions employing an error function employing down-sampling.

5. The method of claim 1 additionally comprising generating the motion-compensated video stream via hierarchical phase correlation motion estimation.

6. The method of claim 5 wherein the generating step comprises building an image pyramid where each level of the pyramid is low pass filtered and downsampled.

7. The method of claim 6 wherein the generating step comprises finding subpixel peak locations.

8. The method of claim 1 additionally comprising generating the motion compensated video stream via an LRU cache in which a key of the cache is a frame index and a hash of filters in a sequence leading up to the cached result.

9. A video processing method comprising the steps of:
receiving a video stream comprising a plurality of motion-compensated frames generated via a mask indicating where motion compensation is valid;
removing a plurality of artifact pixels from the video stream; and
outputting the video stream with the artifact pixels removed; and
wherein the mask is generated by evaluating compensated blocks to find the largest squared difference between two pixels and dividing by a maximum value found in either block subtracted from a minimum value in either block.

* * * * *